United States Patent [19]

Papadopulos

[11] 4,280,014
[45] Jul. 21, 1981

[54] ELECTRIC CABLE INSTALLATIONS

[75] Inventor: Michael S. Papadopulos, Higham, England

[73] Assignee: BICC Limited, London, England

[21] Appl. No.: 121,468

[22] Filed: Feb. 14, 1980

[30] Foreign Application Priority Data

Feb. 27, 1979 [GB] United Kingdom ............... 06825/79

[51] Int. Cl.³ ............................................. B01D 35/02
[52] U.S. Cl. ................................. 174/14 R; 210/243; 210/263
[58] Field of Search ............. 174/14 R, 15 C; 210/39, 210/41, 243, 263, 282, 153

[56] References Cited

U.S. PATENT DOCUMENTS

| 2,112,322 | 3/1938 | Wyatt | 174/14 R |
| 2,713,081 | 7/1955 | Merrell | 174/14 R |
| 3,083,257 | 3/1963 | Andrews et al. | 174/14 R |
| 3,894,171 | 7/1975 | Kusay | 174/14 R |

FOREIGN PATENT DOCUMENTS 4157 9/1979 European Pat. Off. .

Primary Examiner—Ivars C. Cintins
Attorney, Agent, or Firm—Buell, Blenko, Ziesenheim & Beck

[57] ABSTRACT

In an oil-filled electric power cable installation, the oil is pressurized using oil tanks connected to stop joints in the usual way, and an oil-purifying unit is connected between stop joint and tank. The oil-purifying unit comprises a column or bed of a molecular sieve or other active purifying agent with particle sizes, and interstice sizes, big enough to limit the pressure drop across the unit to 20 kN/m² at the most. This eliminates the need to provide bypass passages controlled by valves as the oil can flow both ways through the column.

3 Claims, 1 Drawing Figure

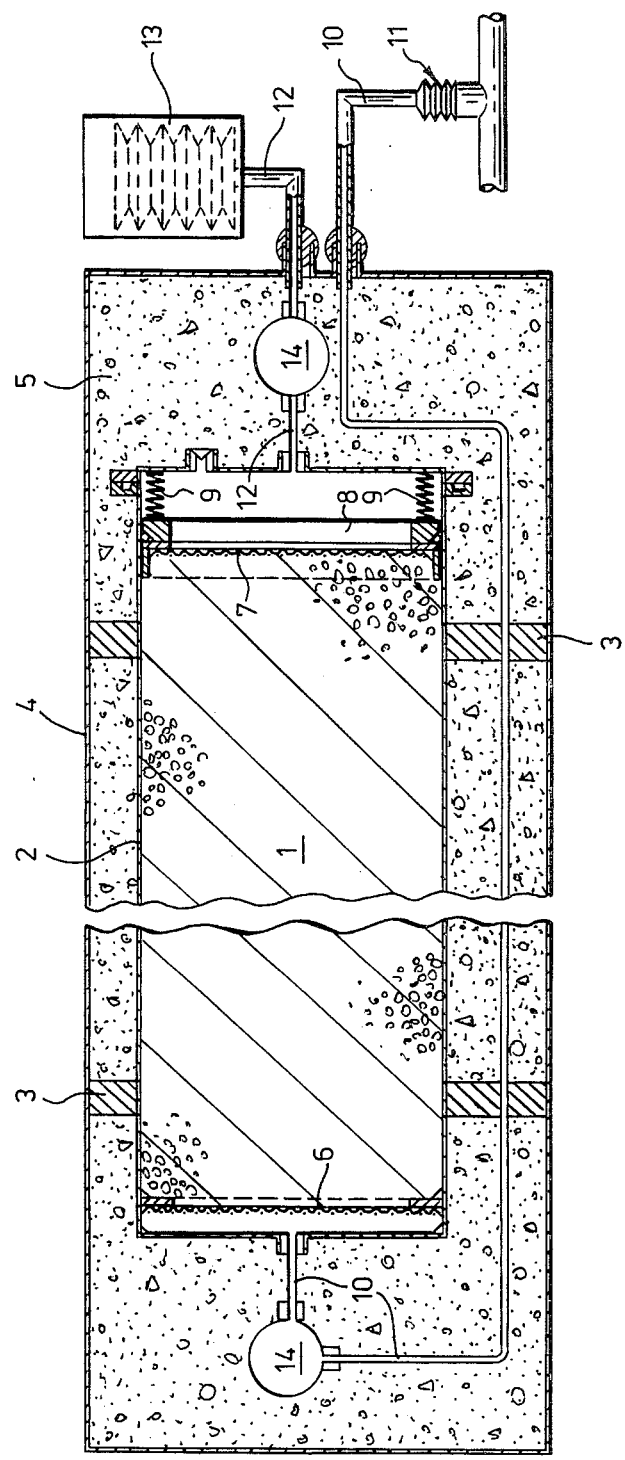

ELECTRIC CABLE INSTALLATIONS

This invention relates to oil filled electric power cable installations of the kind having a mobile liquid insulating impregnant ("oil") that is maintained under pressure by oil tanks connected to the stop joints and incorporating an oil-purifying unit in at least one such connection.

Variations in the electrical load in oil-filled cable installations result in temperature variations and consequently in expansion and contraction of the oil. To limit resulting movements in the oil and to prevent the occurrence of excessively high pressures when substantial variations in height occur between different parts of the installation it is the practice to install at convenient intervals "stop joints" which provide a fluid-tight barrier dividing the installation into hydraulically-independent sections. For the sake of simplicity the expression "stop joint" is used herein in a broad sense so as to include the fluid-tight sealing ends at which the cable is connected to electrical apparatus or to a different type of conductor. Associated with at least one of the stop joints in a hydraulic section is at least one oil reservoir into which the oil can expand when the temperature of the installation rises and which supplies the oil necessary to maintain the required pressure and to keep the insulation completely impregnated when the installation cools.

Such stop joints are amongst the most sensitive parts of a cable installation, because they must provide passages for the flow of oil from conductor potential to the earth potential of the oil tank, whereas elsewhere in the installation the oil is either flowing in a space that is at a sensibly-uniform electrical potential (e.g. inside the load-carrying conductor) or else is present in the pores of paper (which greatly increases its electrical breakdown strength and minimises the risk of the presence of solid impurity particles in the oil). Contamination of the oil with very small quantities of degrading impurities (for example minute copper fibres or other particles derived from the cable conductors or sulphur compounds leached out from rubber sealing rings) which would have no significant effect on the rest of the installation, may therefore result in electrical breakdown in the oil passages and consequent explosive failure of the stop joint (which may cost tens of thousands of dollars to repair in some installations, and in the meantime puts the installation out of service).

In European Patent Application No. 79300298.1 (publication no. 0004157) of BICC Limited (Derek R. Edward) is described an oil-filled electric power cable installation in which oil flow connection between a stop joint and an oil tank comprises two passages in parallel; the first passage provides an oil-purifying unit comprising a percolating filter through which oil normally flows when passing from the cable to the tank; and the second passage contains a one-way valve permitting flow of oil from the tank to limit the extent to which the oil pressure in the cable can fall below that in the tank. In the preferred form of that invention, the first passage also includes a non-return valve to prevent any substantial flow of oil through the filter in the reverse direction, and in addition there is a third passage, in parallel with the first and second passages, which contains a pressure-relief valve permitting oil to by-pass the percolating filter in order to limit the oil pressure in the cable.

The present invention provides an installation which is simpler than our earlier proposal and requires no valves or other moving parts for its operation.

The invention is characterised by the fact that the purifying unit comprises a column or bed of an active purifying agent in the form of granules that define interstitial spaces between them so large that the pressure drop across the purifying unit under the maximum rate of flow that the installation requires is not greater than 20 $kN/m^2$ (200 mbar, 3 p.s.i.), and preferably less than 10 $kN/m^2$(100 mbar, 1.5 p.s.i.).

Because exposure of the oil to the purifying agent is extended (being comparable with the life of the installation compared with less than an hour's exposure in a normal refining operation), the reduced area of contact implicit in using large particles is acceptable.

The size of granule required will vary with its shape and to some extent with other variables of the system, but for a conventionally-designed system with a cylindrical column about 1.2 m long by 0.4 m diameter, spherical or other compact granules with diameters in the range 1–5 mm will usually be appropriate.

Preferably the column or bed is closely bounded, using a wall of wire mesh or other perforate or porous material where the oil is to enter and leave the column or bed, in order to prevent any substantial movement of the particles. Because some settlement is likely to occur, a part of the bounding wall is preferably biassed towards the particles of the column or bed. We prefer to use a cylindrical column or bed with an impervious side-wall and wire mesh end-walls, one of which is fixed and the other biassed inwards.

The purifying unit may include also a mechanical filter for removing from the oil particulate impurities fine enough to pass through the interstices of the column or bed, or better two such filters, one on each side of the column or bed; a fibrous mechanical filter, e.g. of paper, is preferred but other conventional filter media, includes a relatively shallow bed of fine active or inert particles could be used, subject to pressure drop requirements. In suitable cases the filter or filters may form a porous part of the bounding wall of the column or bed; but a filter spaced from the bed is equally effective. When a mechanical filter is placed between the stop joint and the column or bed, it may be associated with a bypass passage and two one-way valves so that oil only passes through the mechanical filter when flowing towards the stop joint.

When the oil is new, the preferred active materials for the granules are the "molecular sieves", especially those based on alumino-silicates. Most preferred is the material known as "Molecular Sieve 13×" which has the composition $Na_{86}((AlO_2)_{86}(SiO_2)_{106}) \cdot x\ H_2O$ (in this and subsequent formulae, x varies with heat-treatment history) and an effective aperture size of about 1 nm (10 Angstrom). This is available bound with fired clay in nominally spherical granules either 1–2 mm or 3–5 mm in diameter, and in nominally cylindrical pellets 1.6 mm or 3.2 mm in diameter; all of these are suitable, but the spherical granules are preferred.

Molecular sieves 4A and 5A, with compositions $Na_{12}[(AlO_2)_{12}(SiO_2)_{12})] \cdot x\ H_2O$ and $Ca_9Na_6[(AlO_2)_{12}(SiO_2)_{12}]_2 \cdot x\ H_2O$ respectively are available in similar granular form and are also suitable.

If, however, the invention is adopted in an existing installation containing old oil, a more powerful active material may be preferred; suitable ones include:

(1) Heat-treated Attapulgite clay, suitably in 4/8 or 8/16 U.S. standard mesh granules (in these mesh formulae, the first figure specifies the number of wires per inch in the standard sieve through which all the material passes and the second that of the standard sieve which retains it all). Suitable granules in both these size grades are supplied by Engelhard Industries Inc. as Attapulgus ALVM and Attapulgus ARVM.

(2) Granular activated alumina, of which that sold by Engelhard Industries Inc. under the designation 'Regular Grade Porocell 10/20 mesh' (which contains up to 2% volatile matter) is preferred; also suitable are activated alumina granules sold by Laporte Industries Ltd. and bleached bauxite, in both cases of about the same particle size.

The single FIGURE of the accompanying drawings is a diagrammatic longitudinal section of the oil-purifying unit of an installation in accordance with the invention.

The column 1 of active granules is cylindrical and has been shown, for simplicity, in a horizontal position; a vertical position can be adopted by using additional support members, and may perhaps be more used.

The column, which can be of any of the recommended granules, is contained in a stainless-steel drum 2 itself secured by supports 3 in a protective casing 4 filled with bitumen or other appropriate material 5. The column is directly confined by the peripheral wall of the drum, and at the ends is contained by a wire mesh screen 6, 7. The screen 6 is fixed but the screen 7 is mounted in a frame 8 that is a sliding fit in the drum and is biassed towards the column 1 by springs 9. One end of the column is connected by a duct 10 to a stop-joint 11, and the other end by a duct 12 to an oil tank 13.

Mechanical filters, if required, can be incorporated in one or both of the screens 6,7 or, as shown, separate filter units 14 can be incorporated in one or both of the ducts 10, 12.

With this design of installation, using a column 1.2 m long by 0.4 m diameter and formed of granules of "Molecular Sieve 13×" nominally spherical and of 3–5 mm diameter, the pressure drop across the column at a flow rate of 2.5 liter per minute for an oil viscosity of 30 cS is about 1 $kN/m^2$.

What I claim as my invention is:

1. An oil-filled electric power cable installation comprising a plurality of oil-filled cable lengths electrically connected in series and hydraulically sectionalized by a plurality of stop joints, each said cable length having an impregnating oil maintained under pressure by oil tanks connected to said stop joints and incorporating an oil-purifying unit located between the oil tank and the stop joint of at least one such connection, said oil-purifying unit comprising a column or bed of an active purifying agent wherein said active purifying agent is in the form of compact granules having diameters in the range of 1 to 5 mm, where by the interstitial space between the granules is such that the maximum pressure drop across said purifying unit in service is not greater than 20$kN/m^2$, flow being reversible through said oil-purifying unit.

2. An installation as claimed in claim 1 characterized in that the said pressure drop is less than 10$kN/m^2$.

3. An installation as claimed in claim 1 or 2 wherein the granules are of a molecular sieve.

* * * * *